F. G. LEWIS.
TRACTION MACHINE.
APPLICATION FILED OCT. 24, 1919.

1,400,690.

Patented Dec. 20, 1921.
3 SHEETS—SHEET 1.

Inventor
Fred G. Lewis

By Herbert E. Smith
Attorney

F. G. LEWIS.
TRACTION MACHINE.
APPLICATION FILED OCT. 24, 1919.

1,400,690.

Patented Dec. 20, 1921.
3 SHEETS—SHEET 2.

Inventor
Fred G. Lewis

By Herbert E. Smith
Attorney

F. G. LEWIS.
TRACTION MACHINE.
APPLICATION FILED OCT. 24, 1919.
1,400,690.
Patented Dec. 20, 1921.
3 SHEETS—SHEET 3.
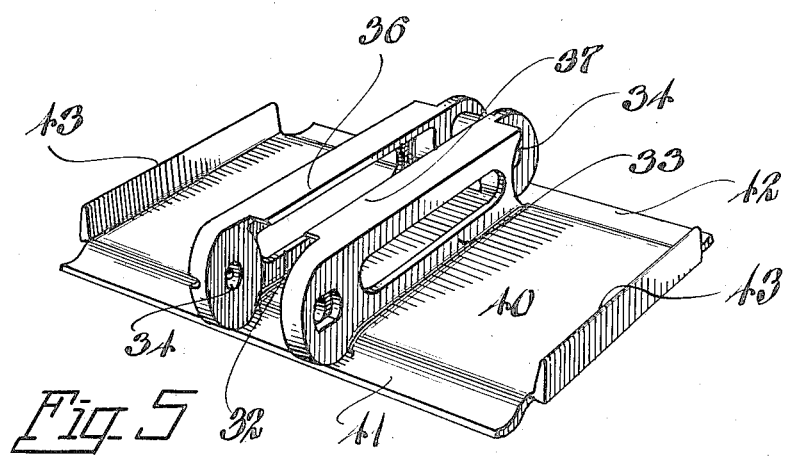
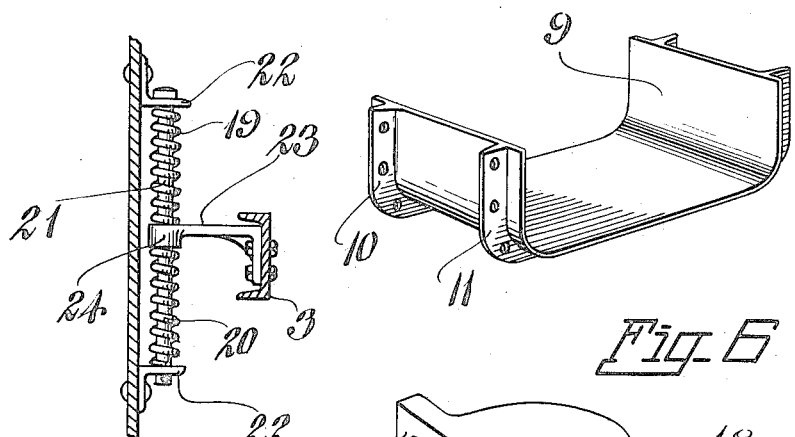
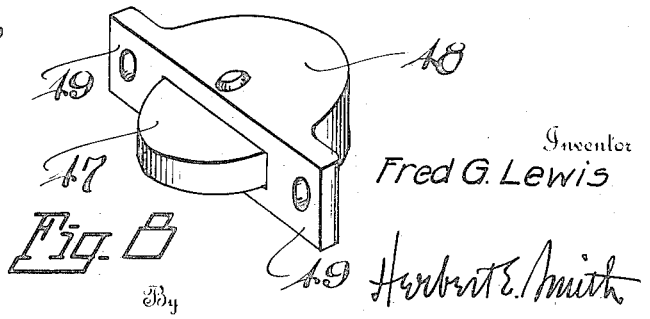
Inventor
Fred G. Lewis
By Herbert E. Smith
Attorney

UNITED STATES PATENT OFFICE.

FRED G. LEWIS, OF DISHMAN, WASHINGTON, ASSIGNOR TO SPOKANE MANUFACTURING COMPANY, OF SPOKANE, WASHINGTON, A CORPORATION.

TRACTION-MACHINE.

1,400,690. Specification of Letters Patent. Patented Dec. 20, 1921.

Application filed October 24, 1919. Serial No. 333,051.

*To all whom it may concern:*

Be it known that I, FRED G. LEWIS, a citizen of the United States, residing at Dishman, in the county of Spokane and State of Washington, have invented certain new and useful Improvements in Traction-Machines, of which the following is a specification.

The present invention relates to improvements in tractor machines or motor vehicles of the type employing the caterpillar form of traction or driving wheels and the subject matter of the invention contemplates, among other features, special arrangement of the two driving members at the sides of the tractor, which members are each provided with a single pivot for supporting the frame of the tractor; novel supporting frames for the driving sprocket and idler and connections of each driving member, which frames also perform the function of guards against the entry of dust and dirt to the operating parts of the traction members, thus eliminating unnecessary friction and enhancing the durability of the traction devices; and means are utilized for holding the flexible traction belt against side or lateral thrust and for keeping the belt alined. These enumerated features, and other novel combinations and arrangements of parts will be more specifically referred to and claimed hereinafter.

In the accompanying drawings one complete example of the physical embodiment of the invention is illustrated, the parts being combined and arranged according to the best mode I have so far devised for the practical application of the principles of the invention.

Fig. 5 is a perspective view of one of the combined chain-link and base or traction plate, the links also forming the track for the supporting wheels.

Fig. 6 is a perspective view of a brace member employed to connect the two side plates or dust guards of the traction member, this device also forming a shield or apron to catch dirt that may fall from the upper flight of the portable track or chain.

Fig. 7 is a sectional view showing the resilient, cushioned, connection at the forward portion of the traction member, between the supporting frame or side plate for the driving wheels, &c., and the vehicle frame.

Fig. 8 is a perspective view of a side thrust roller and its housing employed to hold the traction belt or chain in alinement.

Figure 1:
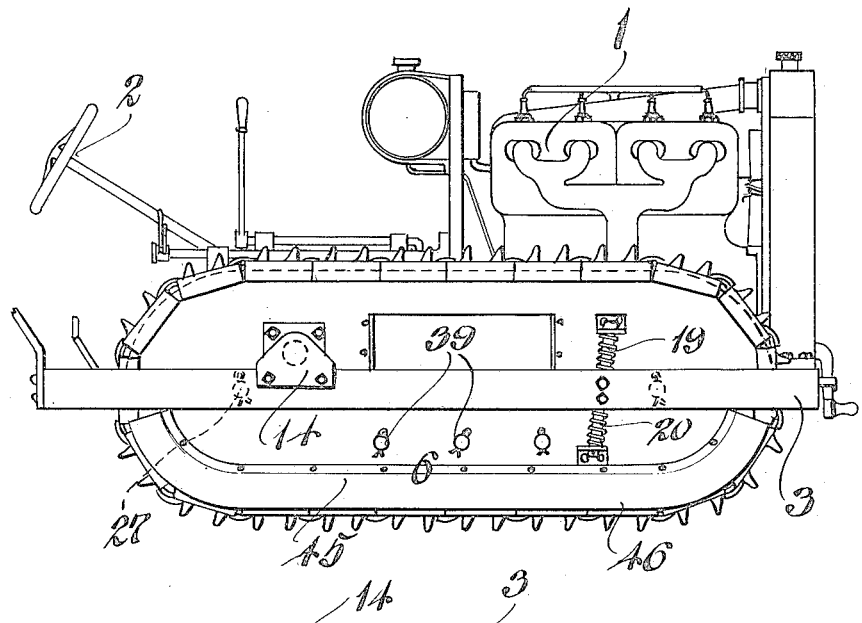
Figure 1 is a side elevation of a tractor machine embodying the subject matter of the present invention.
Figure 2:
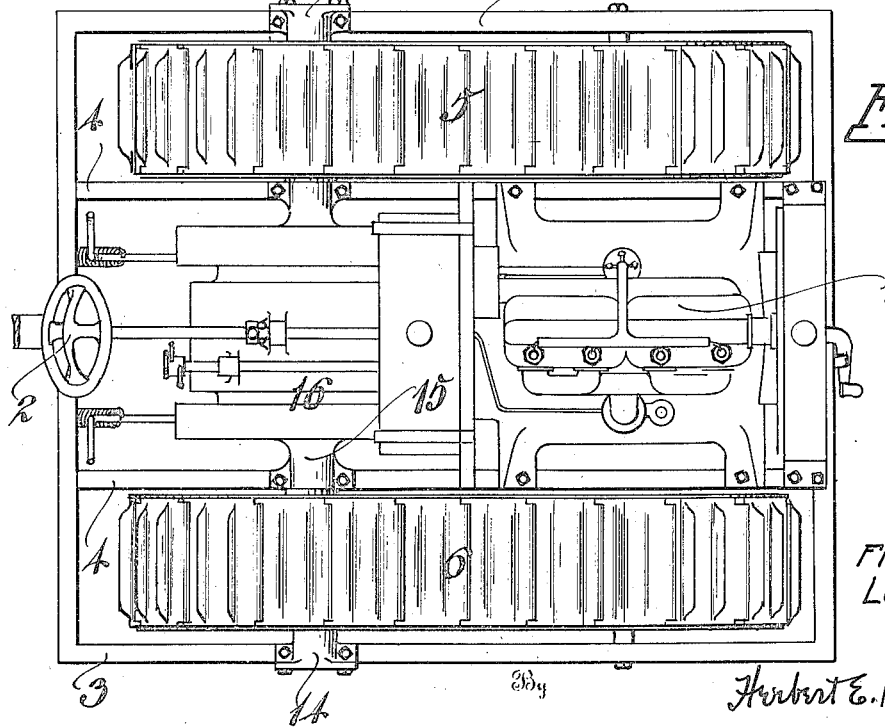
Fig. 2 is a top plan view of the machine of Fig. 1.

In order that the invention may be readily understood I have illustrated the motor vehicle in Figs. 1 and 2, in the nature of a tractor, and propelled by power from the motor 1 and steered in acceptable manner from the steering wheel 2 at the rear of the implement. The operative parts of the machine are supported on the rectangular frame 3, which also includes the longitudinally extending channel irons 4 inside the main frame, which, with the main frame side bars, also of channel irons, provide sub-frames in which the two traction members designated as a whole (in Figs. 1 and 2) by the numbers 5 and 6 are pivoted.

Figure 3:
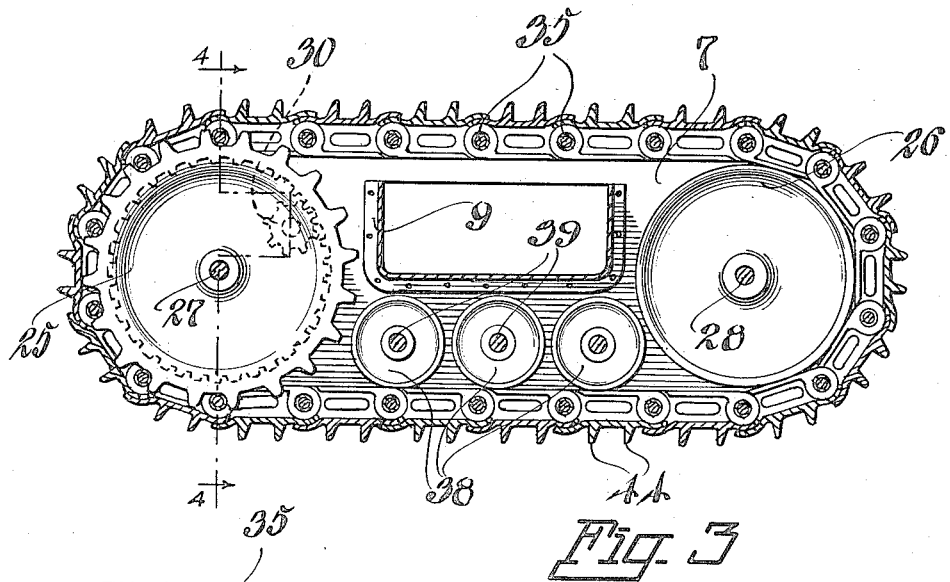
Fig. 3 is a partial sectional view of one of the traction members showing the traction belt or portable track and supporting wheels thereon.

The driving members or traction members 5 and 6 are complementary, and the description and illustration of one will of course suffice for both. Each driving member involves a pair of side plates 7 and 8, of metal, of suitable thickness and proper length and height to perform the required functions, and spaced apart and rigidly held by the U-shaped brace 9 which is of sheet metal, or forged metal fashioned to proper shape, and formed with exterior flanges 10, 11 for bolting to the respective plates 7 and 8 of the driving-device frame. The flanges are perforated for rivets or bolts securing this brace to the side plates, and preferably the side plates are cut out or slotted, as shown in Figs. 1 and 3, for the reception of the brace which thus forms a bridge member between the two vertical or upright plates.

Figure 4:
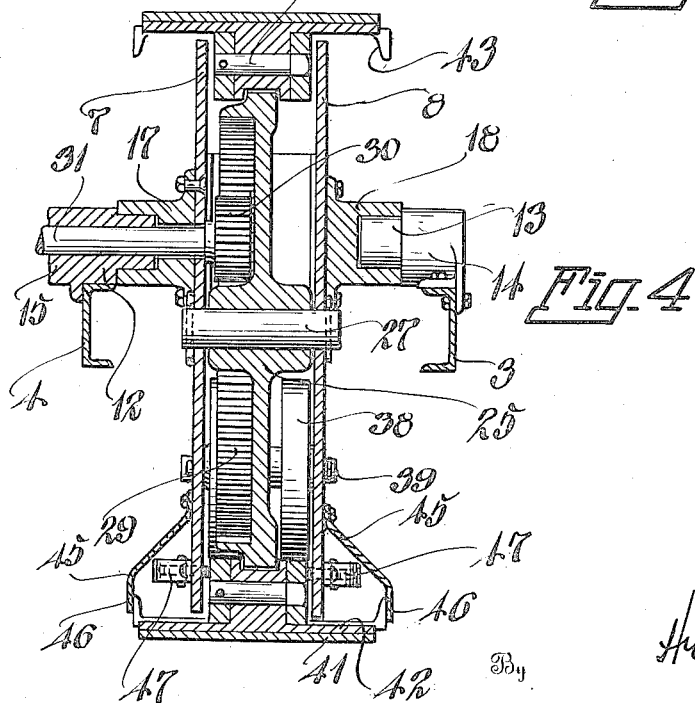
Fig. 4 is an enlarged, transverse vertical sectional detail view at line 4—4 of Fig. 3.

The side plates and bridge form the supporting structure for the driving mechanism, and this supporting structure is pivoted in the sub-frame (see Fig. 4) between the channel beams 3 and 4 on alined pivots 12 and 13, of which the latter is a stub or gudgeon integral with the bearing block 14, bolted or otherwise fixed to the main frame bar 3. The pivot member 12 at the left in Fig. 4 is a sleeve integral with and projected from the hollow bearing block 15 forming part of the housing 16 of the transmission gear of the implement or vehicle, while on the side plates 7 and 8 respectively are rigidly fixed bearing bosses 17 and 18, the former being countersunk to receive the sleeve 12, and the latter having a recess or socket for the gudgeon 13.

As thus described the supporting structure for the driving and traction devices, is free to oscillate in a vertical plane on its pivot points, but this movement of the structure is cushioned near the forward end by the interposition of pairs of springs 19 and 20 at each side of the structure, that are coiled about the spring rod 21 held in the angle brackets 22 fixed to the side plates, An intermediate, bracket arm 23 is fixed to the channel frame bar 3 and projects toward and is coupled on the spring rod by means of its perforated head 24, which may slide up and down on the rod. Thus, vertical movement or oscillation of the supporting structure forward of its pivots is cushioned by this resilient device at each side of the structure, to absorb shocks and jars due to traffic or to irregularities or unevenness of ground.

The driving sprocket 25 and the idler 26 are journaled on their respective stud shafts 27 and 28, supported in openings in the side plates 7 and 8 and retained therein by cotter pins in usual manner, and these wheels are free to revolve on the shafts or axles. The driving sprocket is fashioned with an internal gear 29 at one side, with which the driving pinion 30 meshes, and it will be noted in Fig. 4 that the shaft 31 of the pinion is passed through the bearing boss 17 in which the shaft 31 is journaled, and also through the sleeve 12 and bearing block 15, and it becomes apparent that the pivotal movement of the side plates or supporting frame is on the same longitudinal axis as the rotation of the driving shaft 31, thus providing for oscillatory movement of the supporting frame and driving wheel without interfering with the rotation of the driving shaft.

In Fig. 5 a perspective view of one of the links of the portable track or traction belt is illustrated as an integral unit comprising the two parallel, complementary, upright links 32 and 33, slotted as usual and having their ends rounded and perforated at 34 for the link or joint pins 35 of the hinges or pivot joints of the sprocket-chain portion of the track.

The portable track *per se* is provided by the pair of parallel, complementary, horizontal flanges 36 and 37 of the links, upon which the series of rollers 38, at one side of the longitudinal center of the pair of plates 7 and 8, travel and a second complementary series is located at the opposite side of the plates. These two sets of rollers are journaled on pins 39 which extend transversely of the frame and are supported in the side plates 7 and 8 that are perforated for the purpose, the weight of the implement is carried on these two sets of rollers and the additional sets at the other side of the implement as they travel or run over the tracks formed by the continuous lines of flanges 36—37.

Each link of the portable track has a base plate 40 fashioned with a front and rear, curved, flange as 41, 42 which overlap with those on adjoining links to provide a continuous surface for contact with the ground, and in addition each plate has a pair of lateral, longitudinal flanges 43 on its inner side and ground engaging, transverse ribs 44 on its outer or working face. In Fig. 4, especially, it will be seen that housing plates 45 are provided at the lower portion of the traction members, which plates are attached at their upper edges to the large side plates 7 and 8, and their upright or vertical flanged edges 46 overlap the lateral flanges 43 of the base plates of the portable tracks. These inclined housing plates or shields extend the full length of the ground line of the traction members, and curve upwardly at the front and rear, along the rounded ends of the side plates 7 and 8, to prevent the ingress of mud or dirt or dust at the tread portion of the traction member. There are two of the longitudinal housing plates or tread shields 45, one at each side of the tread portion of the traction device and it will readily be seen in Fig. 4 that these shields will be effective in preventing ingress of mud or dirt or dust to the tread plates or base plates 40 while they are on the ground or turning at either end of the portable track.

The links 32 and 33 forming the sprocket chain, and the tracks 36 and 37 for the wheels or rollers 38 are all inclosed within the two side plates 7 and 8 and are thus protected, while the bridge or brace plate 9 extending transversely of the two side plates, as before stated, also acts as a shield for the rollers 38.

The side plates 7 and 8 support lateral guides for the sprocket chain and portable track, consisting of small, horizontally located rollers 47 journaled in cases or housings 48 that are flanged at 49 and bolted to the outsides of the side plates. Openings extend transversely through each of the plates, and in Fig. 4 it will be seen that the housings or cases 48 are outside the plates while the rollers, lying horizontally, extend transversely through the plates and that the side walls of the links 32 and 33 travel along in contact with these rollers. In this manner the rollers hold the links or sprocket chain alined, and consequently the track ways for the rollers 38 are also held in aline-ment, and the anti-friction rollers thus reduce wear between the chain links and the side plates by holding the chain away from the inner faces of the two plates, but they hold the links, upon which the tracks are formed, in alined movement for the vertical supporting or traction wheels or rollers 38. It will readily be seen that the tread plates and track ways remain stationary under the traction wheels or rollers 38 as the latter pass over the tracks, and the tread plates are continuously picked up at the rear and laid down at the front of the side plates as the machine progresses.

From the above description taken in connection with the drawings it is apparent that a tractor machine is provided possessing novel and efficient traction members and that these members are so related to the main frame which they support that the members may bodily oscillate on their pivots to overcome irregularities of the ground and for steering purposes, and that the traction members are guarded against dust, mud, or dirt entering their operating parts.

Claims:

1. The combination with a main frame and supporting plates, of a driving wheel and an idler and a portable track thereon, traction wheels on said plates contacting with the track, journal members on the frame and bearing members on the plates co-acting therewith to form a pivotal connection for the plates, a resilient connection between said frame and plates comprising a spring rod supported at the outer side of each plate and springs thereon and an arm on the frame for each rod interposed between said springs, and a driving shaft passing in axial alinement with and through one journal bearing for actuating said driving wheel.

2. The combination in a tractor machine with a main frame of a pair of supporting plates, a driving wheel, an idler wheel and a portable track thereon, an intermediate, transverse U-shaped brace connecting said plates, a driving shaft journaled on the frame and a bearing therefor on one of said plates and operative connection between said shaft and driving wheel, a bearing boss on the frame alined with said shaft and a complementary bearing socket for said boss on one plate, spring rods and springs thereon at the outer sides of said plates and arms on said frame interposed between the springs of said rods.

3. The combination of a driving wheel, idler, two spaced plates inclosing said wheels, and portable track, tread plates forming part of the portable track and fashioned with longitudinally extending side flanges, mud shields attached near the lower edges to the outer sides of the plates and overhanging said flanges, and means for actuating the driving wheel.

4. The combination with a pair of spaced inclosing supporting plates of a portable track and actuating means therefor, said track comprising longitudinally extending, spaced links fashioned with track-ways, traction wheels on the plates for said ways, tread plates integral with the links and extending laterally of the supporting plates, side flanges on said tread plates, and mud shields attached to the supporting plates overhanging said flanges.

5. The combination with a pair of spaced supporting plates, of a portable track including inclosed pairs of links between the plates formed with upper flanges, traction wheels on the plates to ride on the flanges, and horizontally disposed guide rollers on said supporting plates engaging opposite sides of said links to guide the track.

In testimony whereof I affix my signature.

FRED G. LEWIS.